(12) United States Patent
Soulie et al.

(10) Patent No.: US 7,658,062 B2
(45) Date of Patent: Feb. 9, 2010

(54) GAS GENERATOR AND TURBOJET FITTED WITH SUCH A GENERATOR FOR STARTING

(75) Inventors: Laurent Soulie, Bordeaux (FR); Roger Fischer, Bordeaux (FR)

(73) Assignee: Snecma Propulsion Solide, Le Haillan (FR)

( * ) Notice: Subject to any disclaimer, the term of this patent is extended or adjusted under 35 U.S.C. 154(b) by 466 days.

(21) Appl. No.: 10/994,192

(22) Filed: Nov. 19, 2004

(65) Prior Publication Data

US 2005/0217530 A1  Oct. 6, 2005

(30) Foreign Application Priority Data

Nov. 21, 2003 (FR) .................................. 03 13639

(51) Int. Cl.
*F02C 3/26* (2006.01)
(52) U.S. Cl. .................... 60/39.823; 60/39.464; 60/39.5
(58) Field of Classification Search .............. 60/39.464, 60/39.53, 255, 39.823, 39.5; 102/88
See application file for complete search history.

(56) References Cited

U.S. PATENT DOCUMENTS

| 2,848,872 | A | | 8/1958 | Proell et al. | |
|---|---|---|---|---|---|
| 2,926,613 | A | * | 3/1960 | Fox | ............................. 102/288 |
| 3,750,394 | A | | 8/1973 | Larsen et al. | |
| 5,525,306 | A | | 6/1996 | Schmucker et al. | |

FOREIGN PATENT DOCUMENTS

DE         42 08 844         9/1993

* cited by examiner

*Primary Examiner*—Michael Cuff
*Assistant Examiner*—Vikansha S Dwivedi
(74) *Attorney, Agent, or Firm*—Weingarten, Schurgin, Gagnebin & Lebovici LLP

(57) ABSTRACT

A gas generator comprises a casing forming a ring or a ring portion and housing a pyrotechnic charge, the casing including at least one vent for ejecting the gas produced during combustion of the charge. Because of its ring design, the gas generator is easy to integrate in the structure of a rotary machine. In particular, it can constitute a starter device for a turbojet.

12 Claims, 3 Drawing Sheets

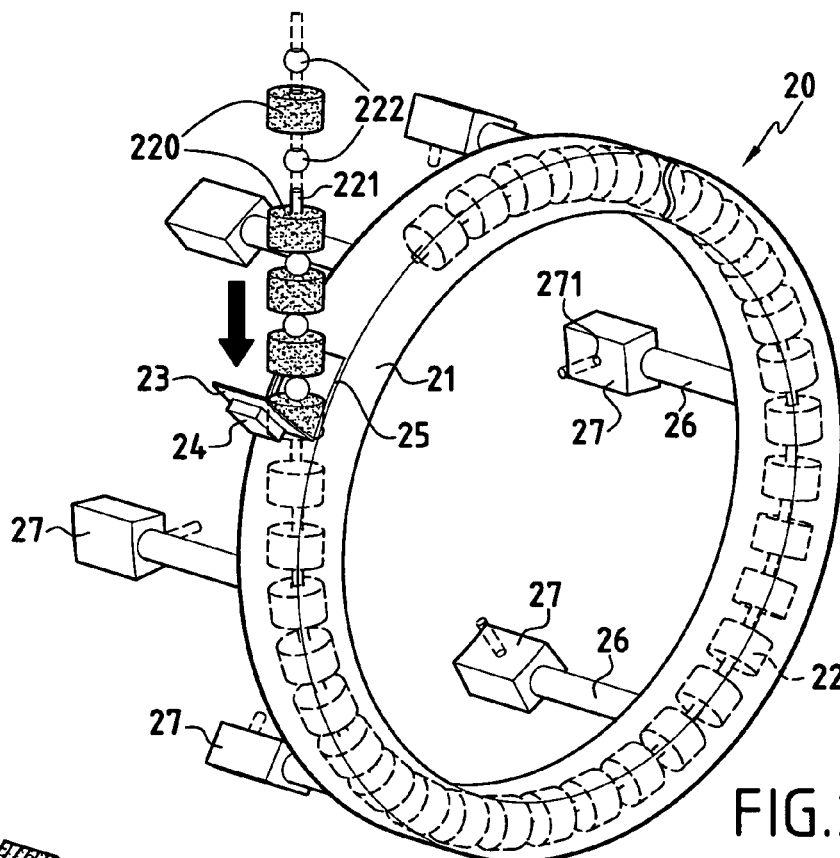
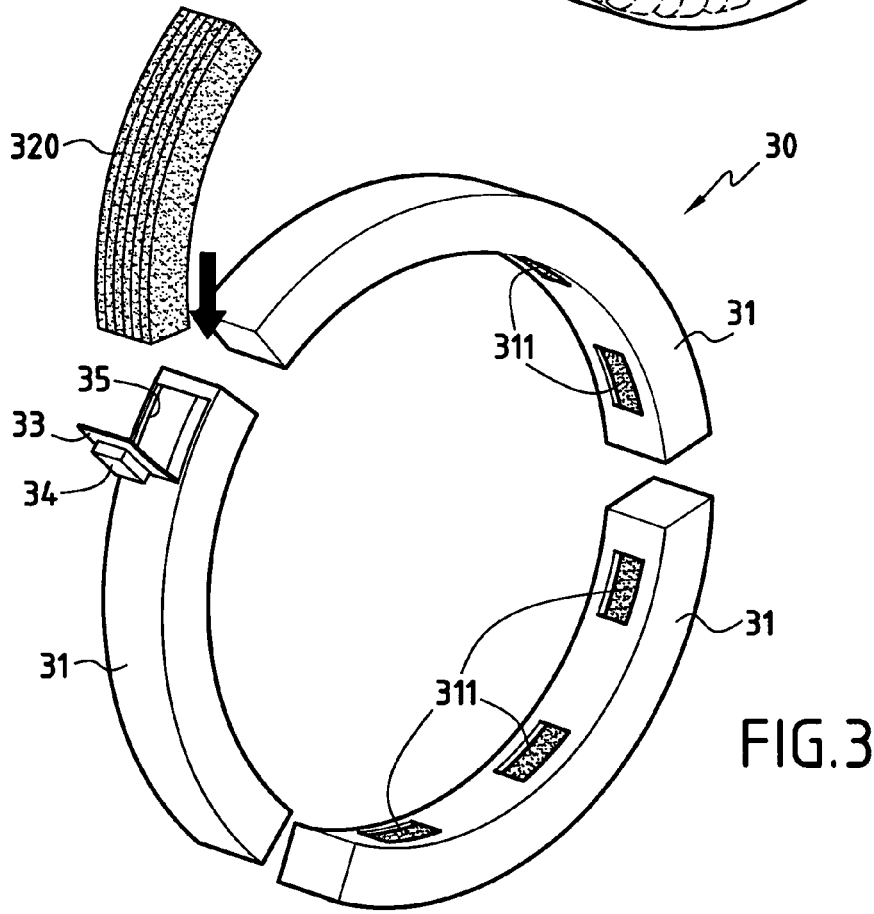

GAS GENERATOR AND TURBOJET FITTED WITH SUCH A GENERATOR FOR STARTING

This application claims priority to a French application No. 03 13639 filed Nov. 21, 2003.

BACKGROUND OF THE INVENTION

The present invention relates to the pressurized gas generators that are used for driving rotary machines such as turbojets.

The field of application of the invention is more particularly, but not exclusively, that of cruise missiles provided with turbojets, and for which overall diametral size is limited.

A cruise missile uses a turbojet for propulsion while in a stabilized stage. For missiles that are launched from an airplane, the turbojet can start while windmilling because of the speed and the altitude from which it is released. For versions that are launched from a ship or a submarine, a gas generator is needed to ensure that the turbojet is set quickly into rotation. More precisely, the flow of gas coming from the generator is used to put the turbine of the turbojet into action.

The gas generators presently used for starting the turbojets of missiles are in the form of cylinders which are housed beside the turbojet. Such a system is particularly penalizing in terms of missile caliber since it leads inevitably to an increase in the outside diameter of the turbojet. Such an increase in diameter can be completely unacceptable, particularly when the size of the missile is limited by the amount of room available in launch devices such as the torpedo tubes of a submarine.

OBJECT AND SUMMARY OF THE INVENTION

An object of the present invention is to provide a gas generator of a design that enables its components to be well integrated in the structure of the vehicle with which it is used in order to eliminate or reduce the impact of the gas generator on the overall size of said vehicle.

According to the invention, this object is achieved by a gas generator comprising a casing of annular or semi-annular shape housing a pyrotechnic charge which produces gas under pressure during combustion. The casing has at least one opening to eject the gas produced. Thus, the main component element of the gas generator, i.e. the casing and the charge constituting the source of pressurized gas, is in the form of a ring, or a ring portion, which is easy to integrate in a structure, particularly when the structure is that of a rotary machine such as a turbojet, for example.

In addition, the pyrotechnic charge is constituted by a plurality of unit charge elements disposed one behind another within the casing. The use of unit elements disposed in ordered manner within the casing makes it possible firstly to facilitate loading the generator in spite of the annular shape of its casing, and secondly to obtain a charge having physical characteristics that are constant and ensure good reproducibility of pyrotechnic operation, as is not the case with a bulk charge, for example.

The pyrotechnic charge may be constituted by a plurality of unit charge segments that are spaced apart from one another inside the casing by resilient spacer means which, once in compression and after the casing has been fully charged, serve to hold the segments in position.

In a variant, the propellant charge is constituted by a chain configuration. Such a chain configuration may be made up of a succession of unit charge elements assembled together by means of at least one connecting cable. The unit charge elements are kept spaced apart from one another by spacers so as facilitate placing them inside the annular casing.

The generator may include one or more ignitors fixed to the casing in order to ignite the pyrotechnic charge. The casing is also provided with an opening and a shutter element enabling the pyrotechnic charge to be introduced into the casing.

The casing may be made of a metal material such as stainless steel or it may be made of a thermostructural composite material.

The invention also seeks to provide a turbojet including a gas generator for starting, where the presence of the generator increases the caliber of the turbojet very little or not at all.

This object is achieved by fitting the turbojet with the above-described gas generator. In accordance with the invention, the gas generator comprises an annular or semi-annular casing housing a pyrotechnic charge which, during combustion, produces gas that enables the compressor or the turbine of the turbojet to be set into rotation. Thus, because of its ring or part-ring structure, the casing is close to the outside shape of the engine and enables the pyrotechnic charge to be distributed around the engine, thereby eliminating or at least minimizing any increase in the caliber of the vehicle.

The gas generator may be placed beside the turbine or beside the compressor.

When placed beside the turbine, the casing of the generator is preferably fixed on the converging portion of the turbine shroud particularly when the turbojet presents a wasp-waist structure at this location. Under such circumstances, the generator also includes means for taking the gas that is produced inside the casing to the blades of the turbine.

When the gas generator is placed in the vicinity of the compressor, the compressed air feed torous already present on the turbojet and used for starting during reception testing on the factory workbench can advantageously be used to form the casing for storing the charge. This enables the design of the starter device to be even more integrated.

BRIEF DESCRIPTION OF THE DRAWINGS

Other characteristics and advantages of the invention appear from the following description of particular embodiments of the invention, given as non-limiting examples and described with reference to the accompanying drawings, in which:

FIG. 2 is a perspective view of a gas generator constituting another embodiment of the invention;

FIG. 3 is a perspective view of a gas generator constituting yet another embodiment of the invention;

DETAILED DESCRIPTION OF EMBODIMENTS OF THE INVENTION

The gas generator of the present invention is described in particular as a device for starting a turbojet. Nevertheless, the invention applies more generally to any machine needing to use gas generators and for which minimizing the size of such a device is of special importance. Thus, the person skilled in the art will have no difficulty in devising other applications for the invention.

Figure 1:
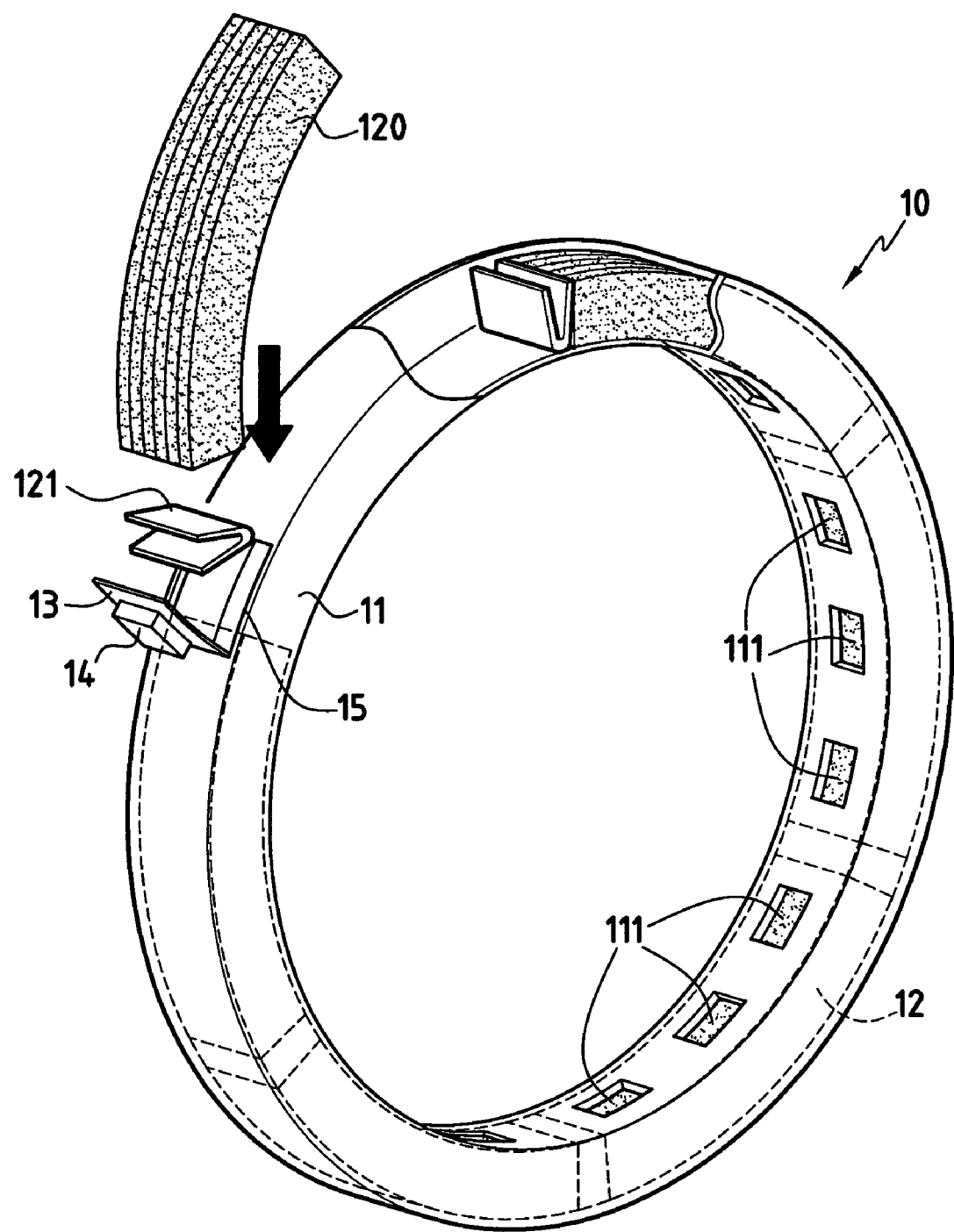
FIG. 1 is a perspective view of a gas generator constituting an embodiment of the invention.

FIG. 1 shows an embodiment of a gas generator in accordance with the invention. The gas generator 10 comprises an annular casing 11 forming a chamber for a pyrotechnic charge 12 made up of a plurality of unit charge segments 120. Each segment 120 is constituted, for example, by a block of solid propellant of curved shape corresponding to the curvature of the casing. The segments 120 can be shaped by molding or by bending. The segments present outside dimensions that are perceptibly smaller than those of the housing formed by the casing 11 so as to leave passages between the segments and the casing to constitute flow paths for the gases produced during combustion. Alternatively, the gas flow paths may be formed directly in the segments by machining grooves or furrows in the surfaces thereof.

In order to enable the gases that are produced to escape from the casing 11, outlet orifices or vents 111 are formed therein. The vents are preferably angularly distributed in regular manner all around the casing so as to obtain substantially uniform pressure inside it. The positioning of the vents in the casing depends on the direction in which it is desired to direct the gases on outlet. Thus, it is possible to direct the gases in one or more directions as a function of the directions in which the vents open out. In addition, the shape and the size of the vents are defined as a function respectively of the shape and the gas flow rate that it is desired to obtain.

As shown in FIG. 1, the segments 120 are inserted into the casing 11 one by one via an opening 15 provided with a shutter element 13 that gives access to the inside of the casing. Resilient spacers 121 are interposed between successive pairs of segments. Once all of the segments have been inserted into the casing, the spacers 121 are compressed and serve to hold the segments in position in the casing.

The charge constituted by the segments 120 is ignited by one or more ignitors 14 which may be constituted, for example, by an ignitor controlled by an electrical line, by detonics, by laser, or by deflagration. In FIG. 1, an ignitor 14 is placed on the shutter element 13, but the ignitor(s) could be disposed anywhere else on the casing 11. The ignitor 14 is connected to control device (not shown) which serves to send the order to ignite.

The embodiment of FIG. 2 differs from that of FIG. 1 in particular in that the charge is made up of a plurality of elements assembled together so as to form an articulated chain. More precisely, a gas generator 20 comprises a charge 22 made up of a plurality of unit charges 220 that are ring-shaped or disk-shaped. The charge elements 220 are held together by a connecting cable 221 which passes through each of the elements. The elements are held spaced apart from one another along the cable 221 by means of spacers 222 interposed between each successive pair of elements during assembly of the charge. The spacers 222 serve to leave gaps between successive charge elements, thus making them easier to put into place inside the annular casing.

The generator 20 of FIG. 2 also differs from that shown in FIG. 1 in that it has means for conveying the gas produced inside the casing to a point that is at a distance therefrom. For this purpose, the generator 20 has ducts 26 opening out into one side of the casing 21 of the generator, with the opposite ends of the ducts opening out into manifolds 27, each having at least one injection orifice 271 for passing the gas that comes from the generator. It is thus possible to position the casing of the generator at a distance from the gas injection point(s).

Furthermore, the gas generator, or more precisely its casing, can be in the form of one or more ring portions. As shown in FIG. 3, a generator 30 may be made up of one or more ring portions, each formed by a respective casing 31. The generator 30 shown in FIG. 3 comprises three ring portions each corresponding to an independent gas generator. Nevertheless, depending on the gas requirements and the space available in the vehicle, the gas generator may be made up of a larger number of ring portions, or on the contrary of only one ring portion.

Thus, each ring portion has its own charge 320 which may be constituted by a propellant block of appropriate shape as described above. The charge may also be made up of a chain of charge elements such as those described with reference to FIG. 2. Each ring portion presents at least one vent 311 for ejecting the gases produced during combustion of the charge. Each portion also includes an opening 35 for loading charge, the opening having a shutter element 33 with an ignitor 34 disposed thereon. If the casing 31 cannot be placed very close to the gas injection points, then it can be fitted with gas delivery means of the kind described with reference to FIG. 2.

Figure 4A:
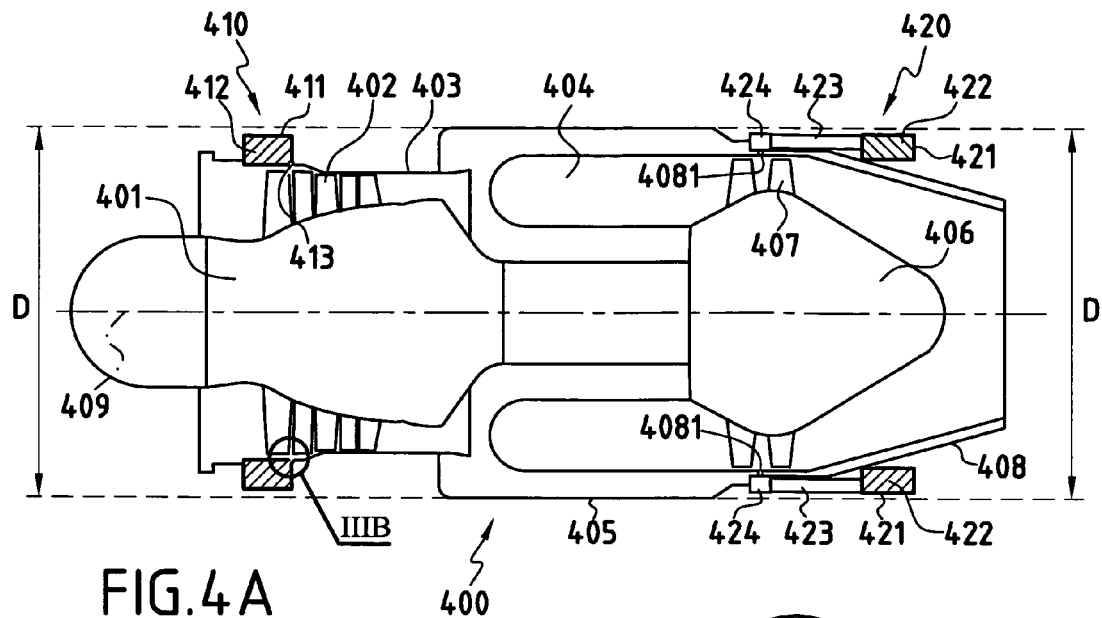
FIG. 4A is a highly diagrammatic section view of a turbojet fitted with gas generators of the invention.
Figure 4B:
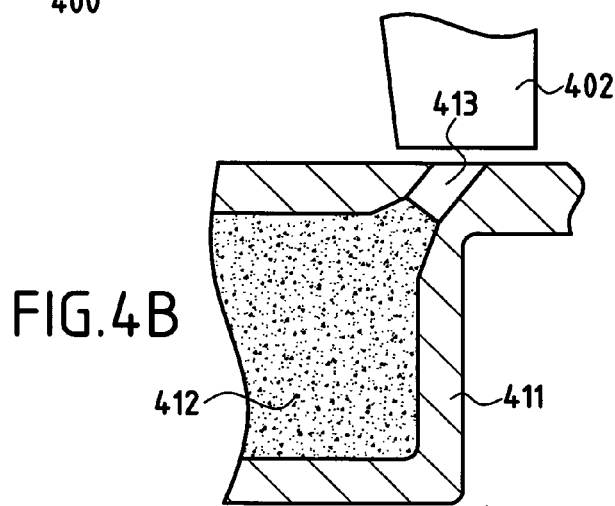
FIG. 4B is an enlarged view of a portion IIIB of the FIG. 4A turbojet.
Figure 5:
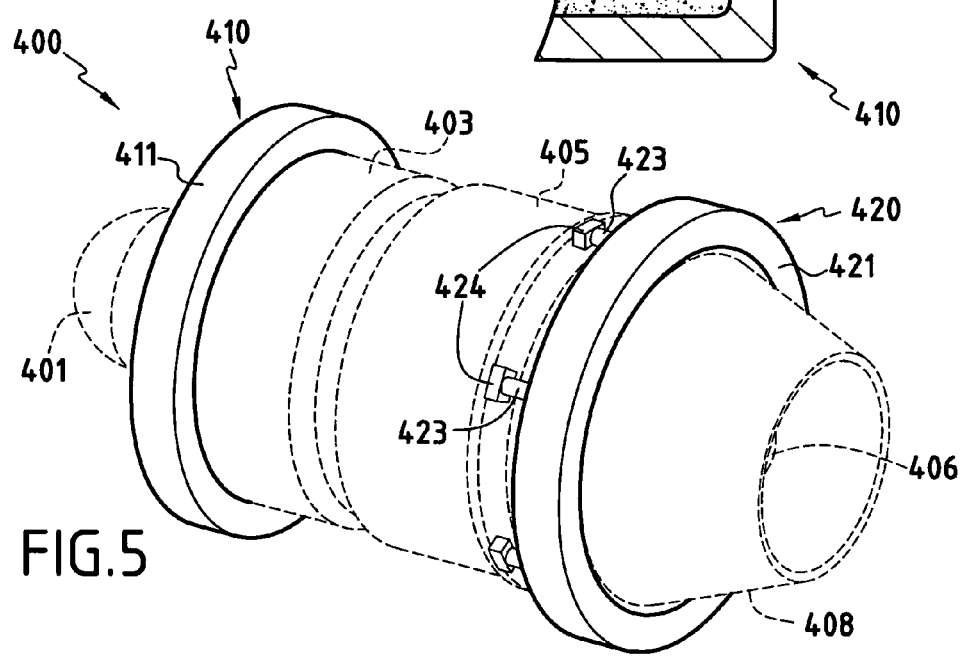
FIG. 5 is a highly diagrammatic perspective view of the FIG. 4A turbojet.

One possible application of the gas generator of the invention is described below, i.e. a device for stating a turbojet. FIGS. 4 and 5 show a turbojet 400 in highly diagrammatic manner, e.g. a jet for propelling a cruise missile. The turbojet typically comprises a compressor 401, a combustion chamber 404, and a driving turbine 406 constrained to rotate with the compressor about an axis 409. The compressor 401 and the turbine 406 have respective blades 402 and 407. In operation, rotation of the turbine 406 which drives the compressor 401 in rotation is provided by drive from hot gases coming from the combustion chamber and acting on the blades 407 of the turbine. Nevertheless, the turbine can be driven by combustion gas only once the turbine and the compressor have reached a certain speed of rotation. Consequently, it is necessary to use a starter device to bring the turbine and the compressor up to a speed of rotation that is fast enough before putting the turbojet into operation proper.

For this purpose, use is made of the gas generator of the invention as described above. FIGS. 4 and 5 show two possible ways in which a gas generator can be integrated in a turbojet in accordance with the invention. For simplification purposes, these figures show a turbojet fitted with two gas generators. Nevertheless, it is preferable for a turbojet to be fitted with only one of the two gas generators shown.

In a first configuration, a gas generator 420 is placed beside the turbine 406 of the turbojet. For this purpose, an annular casing 420 containing a charge 422 can be secured to the outer periphery of the exhaust shroud 408 of the turbine 406. The shroud 408 constitutes a good housing for integrating the casing of the generator because of its converging shape. Thus, as shown in FIG. 4A, by placing the casing 421 far enough towards the rear end of the shroud 408, the overall caliber or diameter D of the turbojet, as defined by the shroud 405 of the combustion chamber 404, is not increased by the presence of the generator 420. With the casing 421 placed behind the turbine blades 407, ducts 423 are used to convey the gas from the casing to the manifolds 424. The manifolds 424 co-operate with orifices 4081 formed through the turbine shroud 408 over the blades 407. In this way, the gas produced in the casing 421 is conveyed to the injection points into the turbine situated level with the blades 407. When the gas opens out into the turbine via the orifices 4081, it acts directly on the blades 407 and sets the turbine into rotation.

Depending on the shape of the turbojet, there are other places where the casing 421 can be located close to the turbine. In particular, when the turbojet is shaped to have a wasp-waist level with the turbine, the casing can be placed in the narrow portion of the structure.

The other way in which the generator can be integrated in the turbojet consists in placing a gas generator 410 beside the compressor 401. This configuration for integration makes it possible to use elements that are already present in the structure of the turbojet. Beside the compressor, the turbojet already includes a torous for delivering compressed air which is provided by the manufacturer in order to enable the turbojet to be started on a test bench by injecting compressed air therein. Thus, the compressed air feed torous can advantageously be used as a casing 411 in which a charge 412 is placed. As shown in FIG. 4B, the feed torous has orifices 413 which enable gas to be injected under pressure tangentially to the blades 402 of the compressor 401. This configuration consequently enables the gas generator to be integrated very closely with the turbojet. The original feed torous may naturally be modified to provide a storage volume that is appropriate for the pyrotechnic charge that is needed, and to be fitted with at least one filler opening provided with its shutter element and with an ignitor as described above.

The turbojet described herein is fitted with generators in which the casing forms a complete ring. Nevertheless, the turbojet could be fitted with a gas generator constituted by one or more ring portions, of the kind described above, in particular with reference to FIG. 3.

The present invention thus proposes a gas generator of design that can be defined to be well integrated in the structure on which it is to be placed. This is made possible in particular by using, as the source of gas under pressure, a pyrotechnic charge that can be shaped easily into a shape that matches that of the casing. In addition, the use of a pyrotechnic charge in the gas generator of the invention does not require special precautions to be taken during storage of the generator or of a vehicle fitted with such a generator since the charge in segmented or chain form can be put into place in the casing at the last moment.

Finally, for a turbojet or any other rotary machine fitted with blades or the like, the casing can be used as a circuit for injecting compressed air for the purpose of performing operating tests in the factory.

What is claimed is:

1. A gas generator comprising a casing forming at least a portion of a ring and housing a pyrotechnic charge;
    the casing having at least a semi-annular shape with respect to a longitudinal axis for integration with a rotary machine and comprising:
        coaxially inner and outer curved wall portions radially disposed with respect to the longitudinal axis,
        forward and rearward wall portions spaced axially from each other with respect to the longitudinal axis and connecting the inner and outer curved wall portions,
        the inner and outer curved wall portions and the forward and rearward wall portions defining a chamber therein, the chamber spaced radially from the longitudinal axis and extending circumferentially with respect to the longitudinal axis, the forward and rearward wall portions defining an axial width of the chamber, and
        at least one opening for ejecting the gas produced during combustion of the charge; and
    the pyrotechnic charge comprises a plurality of discrete unit charge elements, wherein:
        the discrete unit charge elements are disposed in serial succession circumferentially along the circumferential extent of the chamber,
        serially adjacent ones of the discrete elements are separate from each other at discrete locations spaced circumferentially along the circumferential extent of the chamber, and
        each of the discrete unit charge elements has a width that fits substantially within the axial width of the chamber to hold the elements in position axially between the forward and rearward wall portions.

2. A gas generator according to claim 1, wherein the pyrotechnic charge is made up of a plurality of unit charge segments spaced apart from one another by means of resilient spacer elements.

3. A gas generator according to claim 1, wherein the pyrotechnic charge is constituted by a chain made up of a succession of unit charge elements.

4. A gas generator according to claim 1, wherein the unit charge elements are disposed in a chain on at least one connection cable and are held spaced apart from one another on the cable by spacers.

5. A gas generator according to claim 1, including at least one ignitor fixed to the casing to control ignition of the pyrotechnic charge.

6. A gas generator according to claim 1, wherein the casing presents an opening enabling the pyrotechnic charge to be introduced into the casing, the opening being provided with a shutter element.

7. A gas generator according to claim 1, wherein the casing is made of a metal material or a thermostructural composite material.

8. A turbojet comprising a compressor and a turbine constrained to rotate together, the turbojet including a gas generator comprising:
    a casing forming at least a portion of a ring and housing a pyrotechnic charge, the casing having at least one opening for ejecting the gas produced during combustion of the charge, and wherein the pyrotechnic charge is made up of a plurality of unit charge elements disposed one behind the other inside the casing;
    the generator being disposed in the vicinity of the compressor or the turbine so as to entrain them in rotation with the gas produced during combustion of the propellant charge.

9. A turbojet according to claim 8, wherein the gas generator is placed in the vicinity of the turbine.

10. A turbojet according to claim 9, wherein the casing of the generator is fixed on the converging portion of the nozzle shroud and the generator further including means for conveying the gas produced in the casing to the blades of the turbine.

11. A turbojet according to claim 8, wherein the gas generator is placed in the vicinity of the compressor.

12. A turbojet according to claim 11, wherein the casing of the generator is constituted by a compressed air feed torous of said turbojet.

* * * * *

UNITED STATES PATENT AND TRADEMARK OFFICE
CERTIFICATE OF CORRECTION

PATENT NO. : 7,658,062 B2  Page 1 of 1
APPLICATION NO. : 10/994192
DATED : February 9, 2010
INVENTOR(S) : Soulie et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 831 days.

Signed and Sealed this

Thirtieth Day of November, 2010

David J. Kappos
*Director of the United States Patent and Trademark Office*